(No Model.)
J. P. B. FISKE.
BRUSH FOR DYNAMO ELECTRIC MACHINES AND MOTORS.
No. 501,060. Patented July 11, 1893.
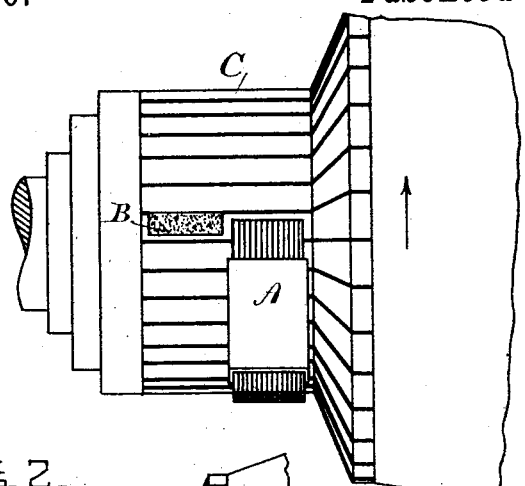
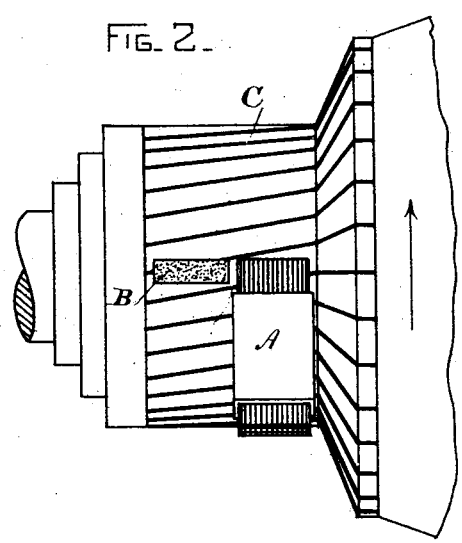
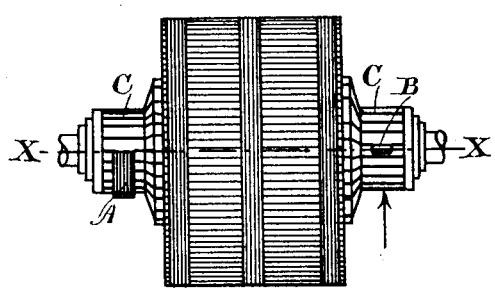
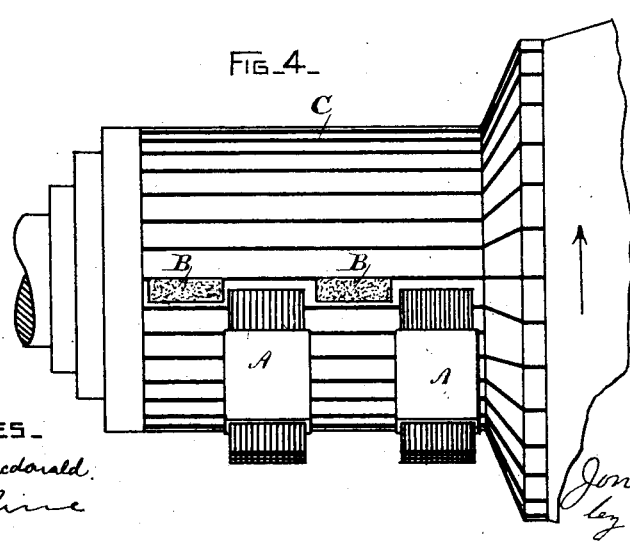
WITNESSES  
Alec F Macdonald  
A. I. Cline
INVENTOR  
Jonathan P. B. Fiske  
by Bentley & Blodgett  
Attys.

UNITED STATES PATENT OFFICE.

JONATHAN P. B. FISKE, OF LYNN, ASSIGNOR TO THE GENERAL ELECTRIC COMPANY, OF BOSTON, MASSACHUSETTS.

BRUSH FOR DYNAMO-ELECTRIC MACHINES AND MOTORS.

SPECIFICATION forming part of Letters Patent No. 501,060, dated July 11, 1893.

Application filed January 31, 1893. Serial No. 460,225. (No model.)

*To all whom it may concern:*

Be it known that I, JONATHAN P. B. FISKE, a citizen of the United States, residing at Lynn, in the county of Essex and State of Massachusetts, have invented certain new and useful Improvements in Brushes for Dynamo-Electric Machines and Motors, of which the following is a specification.

My invention relates to improvements in brushes for dynamo electric machines and motors. It is intended particularly for use with direct current machines, that is, electric machines generating or receiving electric currents which are commuted so as to flow in one direction.

The object of the invention is to enable electric currents to be taken up from the commutator or delivered to it without the occurrence of sparking or flashing between the segments. Such sparking is very apt to occur when the potential difference between the adjacent segments is considerable, or when a large volume of current is flowing, and it destroys or injures the commutator surface. Many arrangements have been devised in the past for overcoming this difficulty, one of the best of which is the use of a carbon brush which on account of its relatively high specific resistance prevents the flow of very heavy currents when an armature coil is short circuited under the brush. On account of its relatively high resistance, however, the carbon brush is only adapted for use with machines using currents of rather high potential, say about two hundred volts, and when heavy currents are to be transmitted a large commutator is required owing to the limited current capacity of the carbon brush. To overcome these difficulties copper and carbon brushes have been combined into a compound brush or composite brush and used together on the commutator, and copper brushes have been arranged to form receptacles for carbon brushes so that the carrying capacity of the copper and the spark preventing properties of the carbon might be utilized. Such arrangements while they work well at first soon give trouble, for the reason that slight sparking at the copper brush produces a roughness of the commutator surface and the contact with the carbon brush is thereby impaired. The trouble is an accumulative one and the carbon brush may become practically useless as a current collecting device on account of the roughness of the commutator surface.

My invention aims to obviate this trouble by placing the copper brush and the carbon or other high resistance brush on different wearing surfaces of the commutator or upon different commutators connected to the same armature coil or coils, so that the two brushes or the compound brush, copper and carbon, have independent bearing points upon the commutator.

The invention comprises broadly, a composite brush for electric machines consisting of a low resistance conductor, and a relatively higher resistance conductor, having independent bearing surfaces on a commutator, said high resistance conductor or brush being placed slightly in advance of the low resistance conductor or brush so that the short circuit through the coil or coils undergoing commutation shall be broken through said high resistance brush or conductor.

In the drawings Figure 1 shows a commutator provided with two brushes in accordance with my invention. Figs. 2, 3 and 4 show modifications.

The invention may be carried out in a number of different ways.

In Fig. 1 a copper brush A and a carbon brush B are placed side by side and are connected to one of the terminal wires leading from the machine. The carbon brush, or brush of highest resistance, is placed slightly in advance of the copper brush in the direction of revolution so that the segment connected to the armature coil in which the current is being reversed leaves this brush last. The opposite wire of the circuit is connected similarly to brushes upon the other side of the commutator C. Any slight sparking at the copper brush which might cause roughness of the commutator can, as is evident, have no influence upon the carbon brush in such an arrangement, as the carbon bears upon a different portion of the commutator surface.

In Fig. 2 the relative lead of the carbon or high resistance brush over the copper brush is obtained by placing the commutator segments themselves at an angle to the shaft, This is not a good mechanical construction, however, and is merely introduced as showing a possible modification of the invention.

In Fig. 3, twin commutators are shown one at each end of the shaft and their corresponding segments are connected to the same coils upon the armature. The carbon brush may be placed slightly in advance of the copper brush, as indicated by the dotted line X, or the segments of the commutator at the right-hand side of the armature may be given a slight lead over those of the commutator at the left-hand side of the armature.

In large machines a number of copper brushes and high resistance brushes, such as carbon, may be placed side by side or alternately, as shown in Fig. 4, or the copper brushes may be placed nearest the armature and the high resistance brushes farthest therefrom, if desired.

In each case, as represented by the above figure, the effect is the same. The arrangements, Figs. 1 and 4, are the preferred ones, though that of Fig. 3 may be found useful for certain purposes.

What I claim as new, and desire to secure by Letters Patent, is—

1. A composite brush for dynamo electric machines, consisting of a low resistance conductor and a relatively high resistance conductor, bearing upon different portions of the length of the commutator, and so arranged that the high resistance conductor is the last to leave the commutator segment, substantially as set forth.

2. A composite brush for dynamo electric machines, consisting of a low resistance conductor and a relatively high resistance conductor, the latter being slightly in advance of the former, and the two conductors arranged to bear upon different portions of the length of the commutator substantially as described.

3. The combination with a commutator of two or more brushes of relatively high and low resistance, bearing upon different portions of the commutator segment, the brush nearest the armature being of low resistance, substantially as described.

4. The combination with an armature having one or more commutators, of brushes of relatively high and low resistance, arranged to bear upon such commutators in different longitudinal positions, the short circuit between adjacent commutator segments being broken through the high resistance brush, substantially as described.

In witness whereof I have hereunto set my hand this 27th day of January, 1893.

JONATHAN P. B. FISKE.

Witnesses:
JOHN W. GIBBONEY,
BENJAMIN B. HULL.